Oct. 9, 1962     E. O. ZILL     3,057,278
CAMERA AND DETACHABLE LENS
Filed Aug. 15, 1956     4 Sheets-Sheet 1

INVENTOR
EDWIN O. ZILL
BY Strauch, Nolan & Neale
ATTORNEYS

Oct. 9, 1962   E. O. ZILL   3,057,278
CAMERA AND DETACHABLE LENS
Filed Aug. 15, 1956   4 Sheets-Sheet 2

INVENTOR
EDWIN O. ZILL
BY Strauch, Nolan & Neale
ATTORNEYS

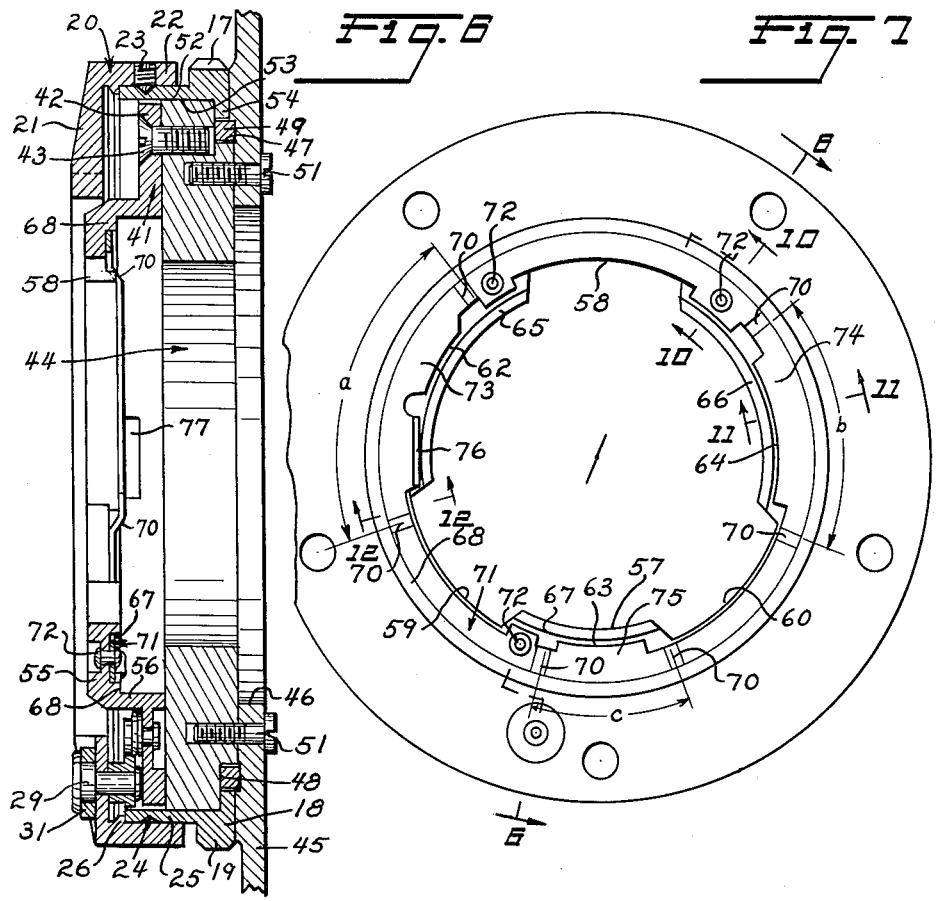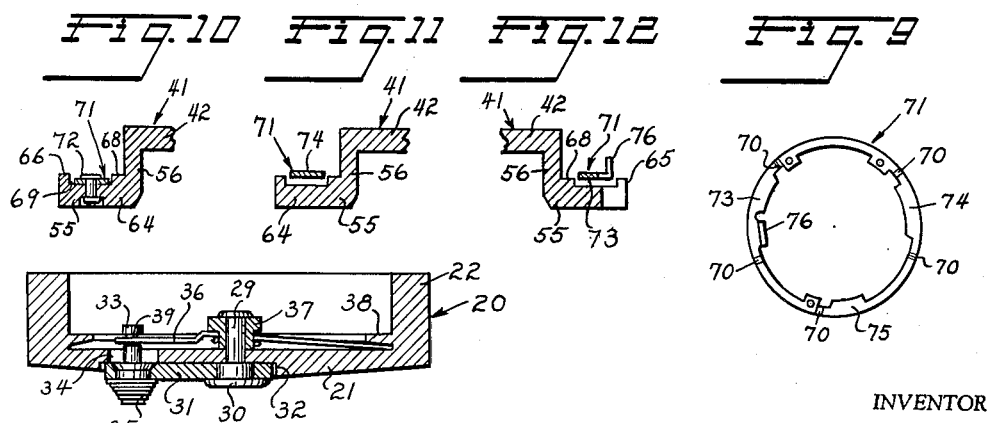

INVENTOR
EDWIN O. ZILL

BY Strauch, Nolan + Neale
ATTORNEYS

United States Patent Office 3,057,278
Patented Oct. 9, 1962

3,057,278
CAMERA AND DETACHABLE LENS
Edwin O. Zill, Ann Arbor, Mich., assignor, by mesne assignments, to Argus Incorporated, a corporation of Delaware
Filed Aug. 15, 1956, Ser. No. 604,094
19 Claims. (Cl. 95—44)

This invention relates to interchangeable lens arrangements for cameras and has particular concern with novel construction whereby the lens mount may be accurately and speedily attached in operative position on the camera and also be readily detachable, both attachment and detachment being effected quickly and easily and not involving complicated instructions or actions.

In its preferred embodiment the invention will be described as incorporated in a lens mount having a bayonet-type attachment formation adapted to interlock with special socket structure on the camera. It has been proposed heretofore to attach lens mounts to cameras by various forms of bayonet-type attachments and a number of patents have been granted on various constructions. Many of these prior efforts are unsatisfactory in that they do not properly locate the lens particularly where it is to be coupled to range-finder mechanism, and many which provide such a coupling are relatively complicated, difficult to attach or detach and subject to damage in the hands of unskilled operators. In general applicant's knowledge of the prior art before the invention convinced him that the problem of providing a relatively simple lens mount attachment structure which would enable an unskilled camera owner to easily and accurately change lenses was far from solution, and the major object of the present invention is to provide a special lens mount and socket construction satisfying such requirements for practical use.

A further object of the invention is to provide a novel lens mount attachment and detachment structure for a camera wherein the lens mount has a bayonet-type end fitting into a corresponding socket having novel indexing and locking mechanism.

Further objects of the invention will appear as the description proceeds in connection with the annexed drawings wherein:

FIGURE 6 is a section on line 6—6 of FIGURE 7 showing socket and latching details;

FIGURE 7 is a rear end view of the socket member, particularly showing the bayonet biasing spring;

FIGURE 8 is a section on line 8—8 of FIGURE 4 showing the manual release lever structure;

FIGURE 9 is a plan view of the spring ring apart from the socket;

Figure 3:
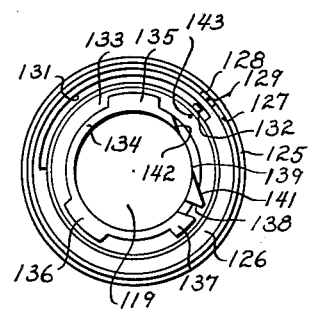
FIGURE 3 is an inner end view of the lens mount showing the bayonet lugs and the index marks.
Figure 5:
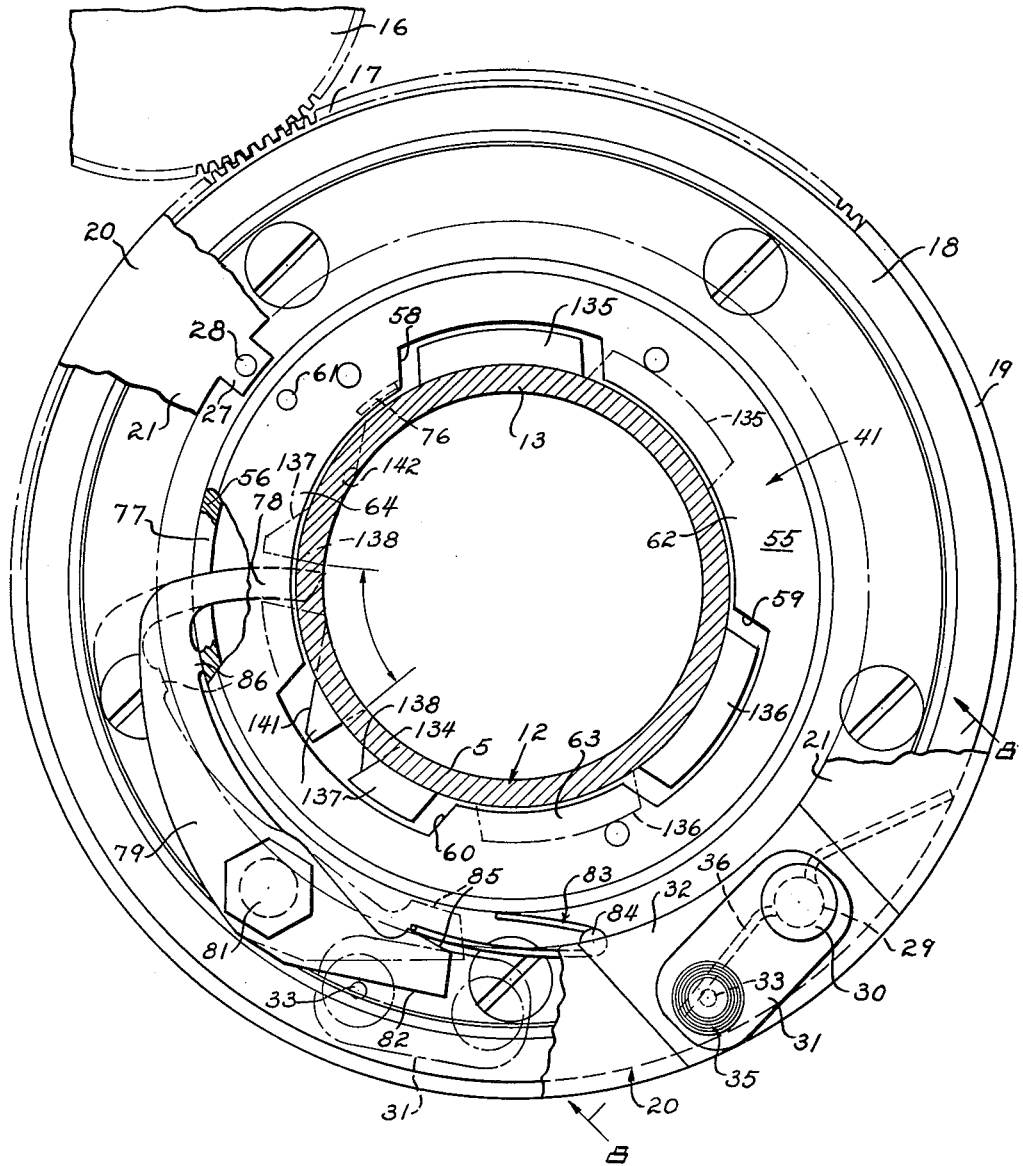
FIGURE 5 is a fragmentary rear view of part of the gear key ring showing the latch contacting pin.
Figure 13:
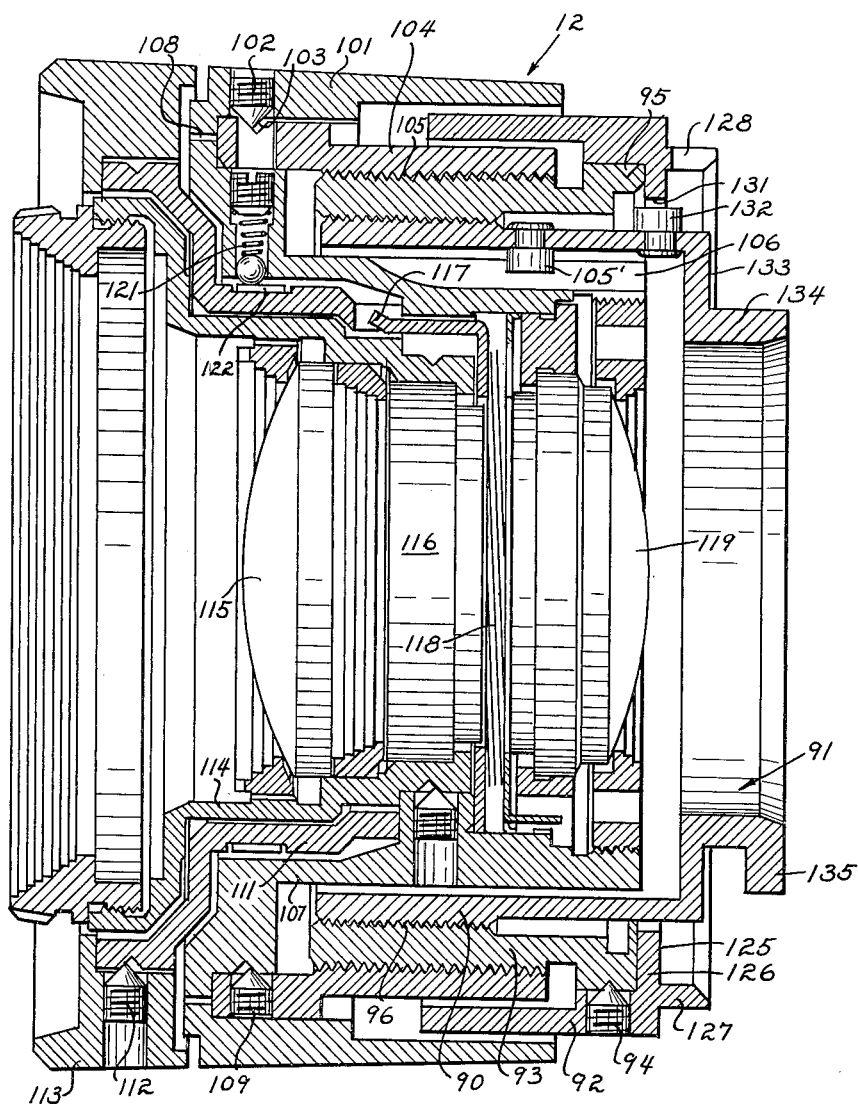

FIGURES 10, 11 and 12 are fragmentary sections along lines 10—10, 11—11 and 12—12 of FIGURE 7 along the spring ring in the socket channel;

FIGURE 13 is an enlarged section through the lens mount of FIGURE 3.

Camera Structure

The camera 10 is of generally conventional construction and comprises a body 11 formed with a front wall opening before which the lens mount 12 is detachably mounted. Within the camera is an adjustable rangefinder mechanism housed at 13 with spaced front window openings at 14 and 15, and the adjustment of the rangefinder elements within housing 13 is effected by rotation of a gear 16 journaled on body 11 and having its teeth meshed with a focusing gear sector 17 formed on the periphery of a focusing gear 18 that as will appear is mounted on the camera body for rotation about the optical axis of the lens. Gear 18 has a smooth peripheral flange 19 extending around the remainder periphery between the ends of gear sector 17.

Secured rigidly upon the focusing gear 18 is a gear key ring 20 which as shown in FIGURE 6 comprises a flat annular rim 21 and a short cylindrical skirt 22 formed with three equidistant radial openings for set screws 23 that coact with an annular groove 24 in the cylindrical skirt 25 of focusing gear 18 telescoped therein. An internal annular stop rib 26 within ring 20 abuts the end of gear skirt 25 to relatively locate them axially. Thus gear 18 and ring 20 rotate together as a unit.

Gear key ring 20 is formed at one portion of the inner circular periphery of rim 21 with an inwardly projecting integral rectangular key or lug 27 on which is indented a red index dot 28. Diametrically opposite dot 28 is fixed a pivot pin 29 having an enlarged head 30 overlying a short release lever 31 freely pivoted on pin 29. The pin 29 and lever 31 are disposed in a surface recessed section 32 of rim 21 and the free end of lever 31 has fixed to it a latch contacting pin 33 that extends through an enlarged hole 34 in rim 21 (FIGURE 8). A manual knob 35 is fixed on the outer side of lever 31. A spring 36 intermediately coiled about a freely rotatable hub bushing 37 on pivot pin 29 has opposite arms bearing on skirt 22 and pin 33 so that lever 31 is normally biased to its radially outer position and may be swung inwardly to the limit permitted by opening 34 for a purpose to appear.

Referring to FIGURE 8 it will be observed that the interior of ring 20 is formed with an annular radial lip 38 for axially confining one arm of spring 36, the coiled part of the spring is trapped under hub 37 and the other arm of the spring is axially restrained by its slidable engagement with an annular groove 39 in pin 33 whereby these parts maintain their assembly in operation.

The socket assembly is rigid with the camera body and it comprises a rigid member 41 having a flat annular attachment flange 42 through which passes a series of countersunk head screws 43 threaded into a shutter assembly wafer 44 fixedly but removably mounted on the camera front wall 45.

As shown in FIGURE 6 the stationary front wall 45 of the camera is formed with the optical axis opening 46 that is surrounded by a shallow annular surface recess 47. The axially rigid shutter wafer 44 is centrally apertured in line with the optical axis and has an inwardly facing smooth annular shoulder surface 48 that contacts an annular square cross-section spacer ring 49 seated in groove 47. Shutter wafer 44 is drawn tightly against spacer ring 49 by a series of screws 51 that also secure it rigidly to the camera wall 45.

A cylindrical surface 52 formed on shutter wafer 44 fits snugly and rotatably within the smooth cylindrical bore 53 of focusing gear 18. A radially inwardly extending flange 54 on focusing gear 18 projects with running clearance between surface 48 and the adjacent flat surface area of wall 45 so that the focusing gear 18 is freely journaled for rotation about the optical axis and maintained against outward axial movement.

Figure 1:
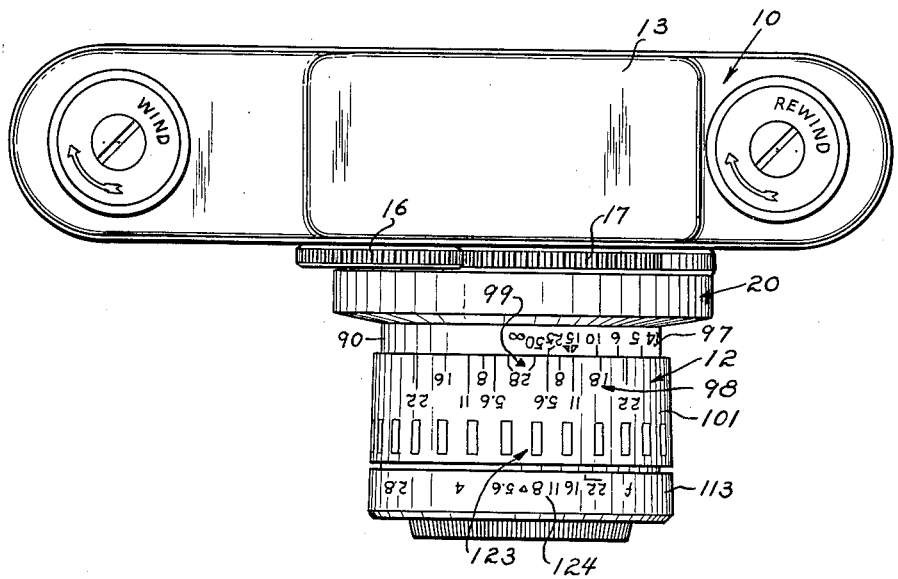
FIGURE 1 is a top plan view of a camera having attached thereto a lens mount according to a preferred embodiment of the invention.
Figure 2:
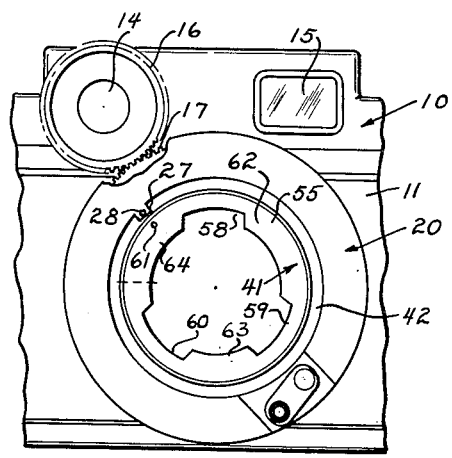
FIGURE 2 is a front view of the camera with the lens mount removed to show the socket and index marks and partially broken away to show the range-finder coupling.

Socket member 41 (FIGURES 2 and 7) has a forward generally annular flat radial flange 55 smaller than flange 42 and integrally connected thereto by a short cylindrical section 56. Flange 55 has a circular inner periphery 57 into which are recessed three bayonet socket recesses 58, 59 and 60 all of the same size but spaced at different locations around the socket periphery, and these recesses are adapted to receive the bayonet lugs on the lens mount to be described. These recesses divide the edge of flange 55 into three socket lugs 62, 63 and 64 of the same radial depth but of different arcuate lengths. An index dot 61 is marked in red on the outer surface of socket flange 55, for coaction with index dot 28. When the ring 20 which is geared to the range-finder adjustment mechanism is turned to radially align dots 28 and 61 as shown in FIGURE 2 the range-finder is set at a predetermined angle with respect to the infinity position and the camera is ready to receive the lens mount.

Referring now to FIGURE 7 it will be observed that at its inner periphery 57 the flat socket flange 55 is formed with inturned axially directed short flanges 65, 66 and 67 on the respective socket lugs. Also at the juncture of flange 55 with cylindrical wall 56 is an integral continuous rib 68, and in the discontinuous annular channel 69 that is thereby created between rib 68 on the outside and flanges 65, 66 and 67 on the inside is disposed a specially formed annular spring ring 71 (FIGURE 9) secured rigidly to socket member 41 at spaced regions where it is flush with the bottom of channel 69 by rivets 72.

Ring 71 is flat with the bottom of channel 69 except for being formed with three spaced spring sections 73, 74 and 75 in the angular regions indicated at $a$, $b$ and $c$ respectively in FIGURE 7. These spring sections are formed by bending the resilient spring material axially at the sloping regions 70 shown at the opposite ends of sections 73, 74 and 75 so that at those sections the ring is spaced above the bottom of channel 69. Thus ring sections 73, 74 and 75 are three separate axial compression springs which as will appear function to relatively bias the lugs of the socket and lens mount as will appear.

FIGURE 10 shows the flat seating of the sections of ring 71 that are riveted to the socket member. FIGURE 11 shows the spaced relation of a spring section of the ring relative to the bottom of channel 69. FIGURE 12 shows the axially directed stop projection 76 integral with the inner edge of ring 71 on spring section 73.

Axially inwardly of the spring ring an elongated slot 77 is formed in the cylindrical wall of the socket member to receive the tip 78 (FIGURE 4) on one end of a lock lever 79 intermediately pivoted at 81 upon socket flange 42. Lever 79 at the end opposite tip 78 is formed with an inclined face 82 adapted to be slidably engaged by pin 33 of release lever 31 when the ring 20 is rotated clockwise to locate lever 31 in the indicated dotted line position of FIGURE 4 which represents the relative position of the parts when the lens mount is to be detached from the camera. The full lines in FIGURE 4 however show the parts as they are positioned when index dots 28 and 61 are aligned and the camera is ready to receive the lens mount.

Figure 4:
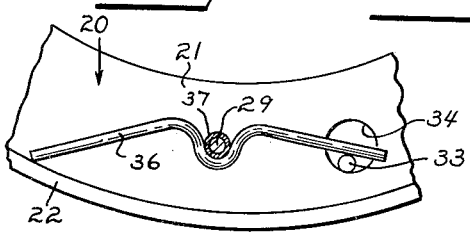
FIGURE 4 is an enlarged view partially broken away and in section showing the socket and the latching mechanism.

Lock lever 79 is normally biased to the full line latched position of FIGURE 4 by a spring 83 coiled about a pin 84 and having one arm bearing against cylindrical wall 56 and the other arm bearing against lever face 85 which is opposite face 82. Adjacent the tip 78 which projects at an angle to the lever 79 substantially radially in the assembly a stop face 86 is formed on lever 79 and this engages socket wall 56 to limit clockwise rotation of lever 79 by spring 83. In order to rock lever 79 to its unlatched dot-dash line position of FIGURE 4 the ring 20 must be in the position indicated by the dot-dash line lever 31 whereupon manipulation of knob 35 to swing lever 31 clockwise will rock lever 79 counterclockwise against the force of spring 83 which will be energized thereby.

Lens Mount

Referring to FIGURES 3 and 13, the lens mount 12 to be detachably mounted on the foregoing camera socket structure comprises a support tube 90 that terminates in a rearwardly disposed bayonet structure indicated at 91. A drive ring 92 is rigidly but removably secured to a focus ring 93 as by set screws 94 engaging an annular groove 95 in the focus ring. The tube is rotatably and axially adjustably mounted on tube 90 as by threaded connection 96. Focus ring 93 carries on its external periphery the distance scale 97 marked from three feet to infinity.

A depth of field scale 98 and an index pointer 99 for the distance scale 97 are marked on the collar 101 which is removably secured as by set screws 102 engaging a groove 103 upon a focus nut 104 that in turn is rotatably and axially adjustably mounted on focus ring 93 by threaded connection 105.

Interiorly tube 90 carries a projecting pin 105' that extends slidably into a shallow straight longitudinal slot 106 formed in the periphery of a mount drive ring 107 which is splined rigidly to collar 101 at 108. Also focus nut 104 is secured to ring 107 as by set screws 109. A sleeve 111 which is secured at its outer end as by set screws 112 to a diaphragm control ring 113 is mounted for rotation on the lens mount tube 114 which carries the front lens 115 and the center lens cell 116 in axially fixed relation. Sleeve 111 has a tong and slot connection 117 with the actuator ring of a conventional diaphragm assembly 118 fixed axially on mount tube 114. The rear lens 119 is likewise mounted upon the rear end of mount tube 114. A spring pressed ball assembly 121 on the lens mount tube coacts with a detent ring 122 on sleeve 111 to maintain the diaphragm settings made in accord with index 123 and the diaphragm opening scale 124.

Drive ring 92 is formed with a flat rear end face 125 that extends over the inwardly directed flange 126 which provides an end abutment for ring 93. A rearwardly projecting annular rib 127 that is continuous except for a notch 128 that is cut down to face 125 in intermediately formed on face 125 and a red index dot 129 (FIGURE 3) is formed on that face at the bottom of the notch. At the inner periphery of flange 126 a sector shaped recess 131 is provided, and a radial pin 132 fixed on the periphery of tube 90 extends into recess 131 so that relative rotation of tube 90 and ring 92 is limited by contact of the pin 132 with the opposite ends of recess 131.

Beyond pin 132 tube 90 is provided with a flat radial face 133 normal to the optical axis, a cylindrical boss 134 that projects rearwardly from face 133 and at the outer end of boss 134 three spaced radial integral parallel surfaced bayonet lugs 135, 136 and 137 are formed. Lugs 135 and 136 are of the same size and are shaped, sized and located to freely axially enter socket recesses 58 and 59 respectively as shown in FIGURE 4. Lug 137 is provided with a radially and axially open slot 138 that is substantially radial but may extend at a slight angle to the radius as shown depending upon the angularity of lock lever tip 78 which fits into it in assembly.

All of the sides of the lugs 135, 136 and 137 are radial except for one side of lug 137 where the boss is deeply recessed to provide a clearance space at 139 to at least the axial thickness of the lugs and provides an inclined cam side face 141 on lug 137 and an oppositely inclined face 142 on boss 134. Face 142 is in radial alignment with stop pin 132 and a red index dot 143 is provided on end face 133 in radial alignment between pin 132 and face 133. It will be noted that sector recess 131 is long enough to permit alignment of drive ring dot 129 with support tube dot 143.

Lens Mount Installation

The gear 16 is manually rotated to rotate ring 20 until the camera parts are positioned as shown in FIGURE 2 with red dots 28 and 61 in radial alignment. Then the drive ring 92 and collar 101 are relatively rotated until red dot 143 on the tube 90 which rotates with collar 101 is radially aligned with red dot 129 on the drive ring, and it will be noted that this is the infinity adjustment position of the lens assembly because index 99 on collar 101 is now opposite the ∞ symbol on the distance scale 97. The lens assembly 12 and the camera are now ready to be secured together.

The lens assembly 12 is now thrust axially as far as it will go into the socket on the camera with the bayonet structure 91 entering socket 41 and with notch 128 of drive ring 92 oriented to fit with lug 27 of ring 20. Because of the unequal spacing of the recesses and lugs this can be done in only one polar position of the lens assembly. The bayonet lugs 135, 136 and 137 thus pass axially through recesses 58, 59 and 60 respectively and are located as shown in full lines in FIGURE 4. Movement of lens assembly 12 axially into the camera socket is effectively limited and stopped by engagement of surface 133 on the end of tube 90 with the smooth flat top surface of socket flange 55.

Now the entire lens assembly 12, still at infinity setting, is rotated to the right in FIGURE 4 about thirty degrees or so. Counterclockwise rotation is not possible because it would be stopped by bayonet lug 135 engaging one side of fixed stop 76. This clockwise rotation moves the bayonet lugs 135, 136 and 137 to their dotted line position of FIGURE 4 where they are axially trapped under the socket lugs 62, 63 and 64 respectively. As the lugs 135, 136 and 137 move clockwise they encounter and move over the adjacent sloping portions of spring ring 71 and axially compress spring sections 73, 74 and 75 and then rotation of the lens assembly is arrested by bayonet lug 137 engaging one side of fixed stop 76 on the socket at about the same time that lock lever 79 enters the slot 138 as explained below. As the lens assembly so rotates clockwise it positively carries with it, by virtue of notch 128 engaging lug 27, the gear key ring 20, and this automatically adjusts the range-finder to infinity.

The lens assembly is locked to the camera at the end of this clockwise rotation. The lock lever tip 78, when the bayonet structure has been axially thrust into the socket is located in the clearance space 139 provided in boss 134 between lugs 135 and 137. As the lens assembly rotates lock lever tip 78 is slidably engaged by cam face 141 of moving lug 137 and displaced radially outwardly against the resistance of spring 83, and when tip 78 and slot 138 become aligned the energized spring 83 acts to swiftly pivot lock lever 79 clockwise until tip 78 is inserted into slot 138 as shown in FIGURE 4.

After the foregoing the lens assembly is properly oriented on the camera, operatively associated with the range-finder adjustment and locked against removal. The springs 73, 74 and 75 bias the assembly against looseness or play axially, and the lock lever 79 prevents rotation of tube 90 and collar 101. As gear 16 is manually rotated by the operator looking through the range-finder, ring 20 is turned and turns with it the drive ring 92 and focus ring 93. The differentially threaded sections 96 and 105 are such as to tend to oppositely axially displace tube 90 and nut 104, and since tube 90 is fixed to the camera this results in outward shift of nut 104. This outward shift is axial only because of the engagement of pin 105' and slot 106. Thus rotation of range-finder adjustment gear moves the entire lens group on mount ring 107 as a unit to focus with respect to the film in the camera.

Lens Mount Removal

First the manual gear 16 is rotated until the ∞ mark on the distance scale 97 aligns with index 99, this radially aligning index dots 129 and 143 and moving ring 20 until the release lever 31 is in the dotted line position shown in FIGURE 4 at which pin 33 is engaged with face 82 of lock lever 79. Release lever 31 is rocked slightly clockwise about its pivot 29 and the sliding engagement contact of release lever pin 33 with the lock lever will rock the latter counterclockwise until tip 78 is withdrawn from slot 138 into the dotted line position of FIGURE 4. With the lock lever so unlatched the operator now grasps collar 101 and rotates it counterclockwise and this rotates the bayonet lugs 135, 136 and 137 into their full line position of FIGURE 4 where they are stopped by engagement of lug 135 with stop 76. Note as shown in FIGURE 7 that this side edge of stop 76 is essentially even with the corresponding edge of recess 59. Now the entire lens assembly 12 can be removed from the camera simply by pulling it straight out away from the camera.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a camera having an adjustable range-finder, a body on which said range-finder is mounted, an axially open bayonet type socket structure on said body for detachably mounting a lens assembly, a rotatable motion transmitting member mounted on said body coaxially of said socket structure, means comprising an externally accessible operating member on said body operatively connecting said motion transmitting member to said range-finder, a detachable lens assembly comprising a support member having a bayonet type end formation adapted for axial insertion into said socket structure, a lens carrying member rotatably adjustably connected to said support member and a drive member for said lens carrying member, means operable upon mounting said support member into said socket structure for automatically interlocking said motion transmitting member and said drive member, separate sequentially operable means for automatically locking said support member with said socket structure during said mounting operation, and cooperating index means on said motion transmitting member and said socket structure and on said support member and said drive member for indicating their relative adjustment to a predetermined lens focus condition for so operatively mounting the lens assembly on the camera.

2. In combination, a camera having a front wall provided with an opening, a socket on said camera wall over said opening, range-finder adjustment connected means on the camera adjacent said socket having a rotatable motion transmitting element, a detachable lens assembly having a rotatable lens focus adjustment member and a bayonet type end structure adapted to axially enter and rotate angularly to interfit with said socket, means on the camera for indexing said element to a predetermined angular condition relative to said socket, means on the lens assembly for indexing said focus adjustment member to a predetermined angular condition relative to said bayonet type end structure, said conditions representing corresponding adjustments of said range-finder and lens assembly, cooperating means on said indexed focus adjustment member and said indexed element interlocked when said bayonet structure is introduced axially into said socket whereby the range-finder adjustment and lens focus adjustment are automatically accurately interconnected, and independent means on said socket and bayonet type end structure automatically responsive to rotation of said introduced bayonet structure in said socket through a predetermined angle for locking said lens assembly to the camera.

3. In combination, a camera having a front wall provided with an opening, a socket on said camera wall over said opening, a rotatable range-finder adjustment control gear on the camera adjacent said socket, a gear member rotatably mounted on the camera about said opening and meshed with said control gear, a lens assembly having a rotatable lense focus adjustment member and a bayonet type end structure adapted to enter and interfit with said socket, means on the camera for indexing said gear member to a predetermined condition relative to said socket, means on the lens assembly for indexing said focus adjustment member to a predetermined angular condition relative to said bayonet type end structure, said conditions representing corresponding adjustments of said range-finder and lens assembly, cooperating means on said indexed focus adjustment member and said indexed gear member automatically interlocked when said bayonet structure is axially introduced into said socket whereby the range finder adjustment and lens focus adjustment are automatically accurately interconnected, and independent means on said socket and said bayonet type end structure automatically responsive to rotation of said introduced bayonet structure in said socket through a predetermined angle for locking said lens assembly to the camera.

4. In combination, a camera having a front wall provided with an opening, a bayonet type socket on said camera wall over said opening, a range finder adjustment control gear on the camera adjacent said socket, a gear member on the camera meshed with said control gear and rotatable about said socket, a lens assembly having a rotatable lens focus adjustment member and a bayonet type end structure adapted to axially enter and rotate angularly to interfit with said socket, means on the camera for indexing said gear member to a predetermined angular condition relative to said socket, means on the lens assembly for indexing said focus adjustment member to a predetermined angular condition relative to said bayonet type end structure, said conditions representing corresponding adjustments of said range-finder and lens assembly, cooperating means on said indexed focus adjustment member and said indexed gear member interlocked when said bayonet structure is axially introduced into said socket whereby the range-finder adjustment and lens focus adjustment are automatically accurately interconnected, independent means on said socket automatically responsive to rotation of said introduced bayonet structure therein through a predetermined angle for locking said lens assembly to the camera, and means on said gear member operable only in a predetermined angular position for actuating said lens assembly locking means to unlock said lens assembly for removal from said socket.

5. In combination, a camera having a front wall provided with an opening, a bayonet type socket on said camera wall over said opening, range-finder adjustment control means including a rotatable member on the camera coaxial with and adjacent said socket, a detachable lens assembly having a rotatable lens focus ring and a bayonet type end structure adapted to axially enter and rotate through a predetermined angle to interfit with said socket, resilient means on said socket axially biasing said end structure, means on the camera for indexing said rotatable member to a predetermined angular condition relative to said socket, means on the lens assembly for indexing said focus ring to a predetermined angular condition relative to said bayonet type end structure, said conditions representing corresponding adjustments of said range-finder and lens assembly, cooperating means on said indexed focus ring and said indexed rotatable member comprising a positive key and associated notch coupling engaged when said bayonet structure is introduced into said socket whereby the range-finder adjustment and lens focus adjustment are automatically accurately interconnected, and independent latch means on said socket automatically actuated by rotation of said introduced bayonet structure through a predetermined angle for positively engaging said end structure for locking said lens assembly to the camera.

6. In combination with a camera front wall having an opening, a bayonet type socket secured upon said wall over said opening, a coaxial ring rotatable about said socket, a manually operable rotatable range-finder adjustment control gear on said camera meshed with a row of gear teeth on said ring, a formation on said ring adapted to interlock with a corresponding focus adjustment control formation on a lens assembly to be detachably mounted in said socket, a pivoted lock lever on said socket enclosed by said ring and normally biased into lens assembly locking position, and means on said ring operable only when said ring is in a predetermined angular position relative to said socket for actuating said lever to lens assembly unlocked position.

7. In the combination defined in claim 6, said means comprising a second lever externally pivoted on said ring and having an internal projection adapted to engage said first mentioned lever when in said predetermined angular position.

8. In combination with a camera front wall having an opening, a socket assembly secured over said opening and comprising an annular lens mount attachment flange provided with a plurality of unequally spaced recesses about its inner periphery which are adapted to permit introduction of the corresponding bayonet lugs on a detachable lens assembly in only one angular position of said lens assembly, said flange having a smooth planar outer surface, means providing a lug biasing compression spring on the underside of each section of the flange located between said recesses, and a rigid projection on said spring providing a lug engaging stop preventing said bayonet lugs introduced into said socket from being turned except in a predetermined direction.

9. In the combination defined in claim 8, said springs being integral axially displaced sectors of a continuous ring of spring metal fixed upon the underside of said flange.

10. In combination with a camera front wall having an opening, a shutter assembly secured over said opening, an annular socket member having a peripheral flange secured to said socket assembly and an axially displaced parallel socket flange formed with a plurality of unequally spaced recesses about its inner periphery, said recesses being spaced and sized to provide for introduction of a bayonet type attachment member of a detachable lens assembly in only one angular position of said lens assembly, a lens assembly locking lever pivoted on said peripheral flange and projecting into the space between said socket flange and the shutter assembly, an annular gear member rotatable about the axis of said shutter assembly, a key ring secured to said gear member and extending over the peripheral flange of said socket member, and means on said key ring operably engaged to actuate said lock lever only when said key ring has been rotated to a predetermined angular position.

11. In a lens assembly adapted to be detachably connected to a camera, a support member, means movably mounting a lens on said member for focusing adjustment, a drive ring rotatable about said member and connected to effect said adjustment when rotated, camera attachment means on one end of said member comprising a flat end face on said member, an annular short boss axially projecting from said face, and a plurality of radial bayonet socket mounting lugs projecting from the free end of said boss, said lugs being unequally spaced circumferentially, and one of said lugs having a radially open locking recess adapted to receive a locking member on the camera, and means providing an axially open drive coupling notch in the edge of said drive ring adjacent and radially outwardly of said lugs.

12. In the lens assembly defined in claim 11, a portion of said boss being removed between said one lug and an adjacent lug to provide a clearance space recess for receiving said locking member during assembly with the camera, and said one lug being formed with an inclined cam face at the adjacent end of said clearance space recess.

13. In a lens assembly adapted for detachable mounting upon a camera, a support member having a flat axial face, a short boss projecting axially from said face, and a plurality of circumferentially spaced radial bayonet socket mounting lugs projecting from the free end of said boss parallel to said face, a peripheral sector recess in said boss open axially outwardly and located circumferentially between two of said lugs, one of said two lugs having a side thereof at one side of said recess inclined with respect to a radius of said boss to provide a locking lever engaging face, said one lug also having a radially open locking lever receiving recess.

14. In the lens assembly defined in claim 13, said recess in the boss at its opposite side being formed with an edge face, and an index mark on said flat face aligned radially with said edge face.

15. In a lens assembly adapted for detachable connection to a camera, an annular support member, a coaxial lens mounting member, a rotatable drive ring interposed between said members and differentially threaded therewith, a bayonet structure on the end of said support member adapted to interfit with a corresponding camera socket, a coupling formation on the end of said drive ring adapted for detachable connection to a focus control member on the camera, and index marks on said ends of the support member and drive ring adapted to be radially aligned to indicate infinity focus position of said lens assembly preparatory to mounting it on said camera.

16. In the lens assembly defined in claim 15, said formation being an edge notch and the index on the drive ring being at the bottom of said notch.

17. In a camera, a bayonet type socket structure, a detachable lens mount having radial lugs at one end adapted to axially enter said socket structure and rotate through a limited angle to interfit therewith, a rotatable focus ring on said lens mount, a rotatable key ring on said camera having an axially separable drive coupling with the lens mount, a lock lever on said socket for positively engaging one of said lugs to latch the socket mounted lens assembly to the camera, a range-finder adjustment control member operable to adjust the rangefinder and connected to simultaneously rotate said key ring to correspondingly focus said lens assembly, and means on said key ring operable only when said control member has been adjusted to infinity focus position for unlatching said lock lever from said one lug.

18. A lens assembly mounting device for ready attachment to a camera or the like comprising an annular support provided at one end with a short cylindrical boss and an axially facing annular flat face surrounding the inner end of said boss, at least three unequally circumferentially spaced outwardly extending radial bayonet socket mounting lugs on the outer end of said boss in axially spaced relation to said flat face, and a transverse radially open locking element receiving recess through one of said lugs.

19. In the lens assembly mounting device defined in claim 18, said boss having an axially open recess extending between said transversely recessed lug and one of the other lugs.

References Cited in the file of this patent

UNITED STATES PATENTS

| | | |
|---|---|---|
| 1,880,635 | Wollensak | Oct. 4, 1932 |
| 1,973,213 | Kuppenbender et al. | Sept. 11, 1934 |
| 2,007,016 | Kubica | July 2, 1935 |
| 2,011,359 | Gaty | Aug. 13, 1935 |
| 2,117,428 | Kuppenbender | May 17, 1938 |
| 2,136,149 | Nuchterlein | Nov. 8, 1938 |
| 2,260,991 | Gorey | Oct. 28, 1941 |
| 2,270,311 | Kende et al. | Jan. 20, 1942 |
| 2,319,083 | Nowack et al. | May 11, 1943 |
| 2,496,928 | Bing et al. | Feb. 7, 1950 |
| 2,526,433 | Svensson | Oct. 17, 1950 |
| 2,529,894 | Altman et al. | Nov. 14, 1950 |
| 2,715,854 | Simmons et al. | Aug. 23, 1955 |
| 2,900,887 | Nerwin | Aug. 25, 1959 |

FOREIGN PATENTS

| | | |
|---|---|---|
| 742,599 | Great Britain | Dec. 30, 1955 |